UNITED STATES PATENT OFFICE.

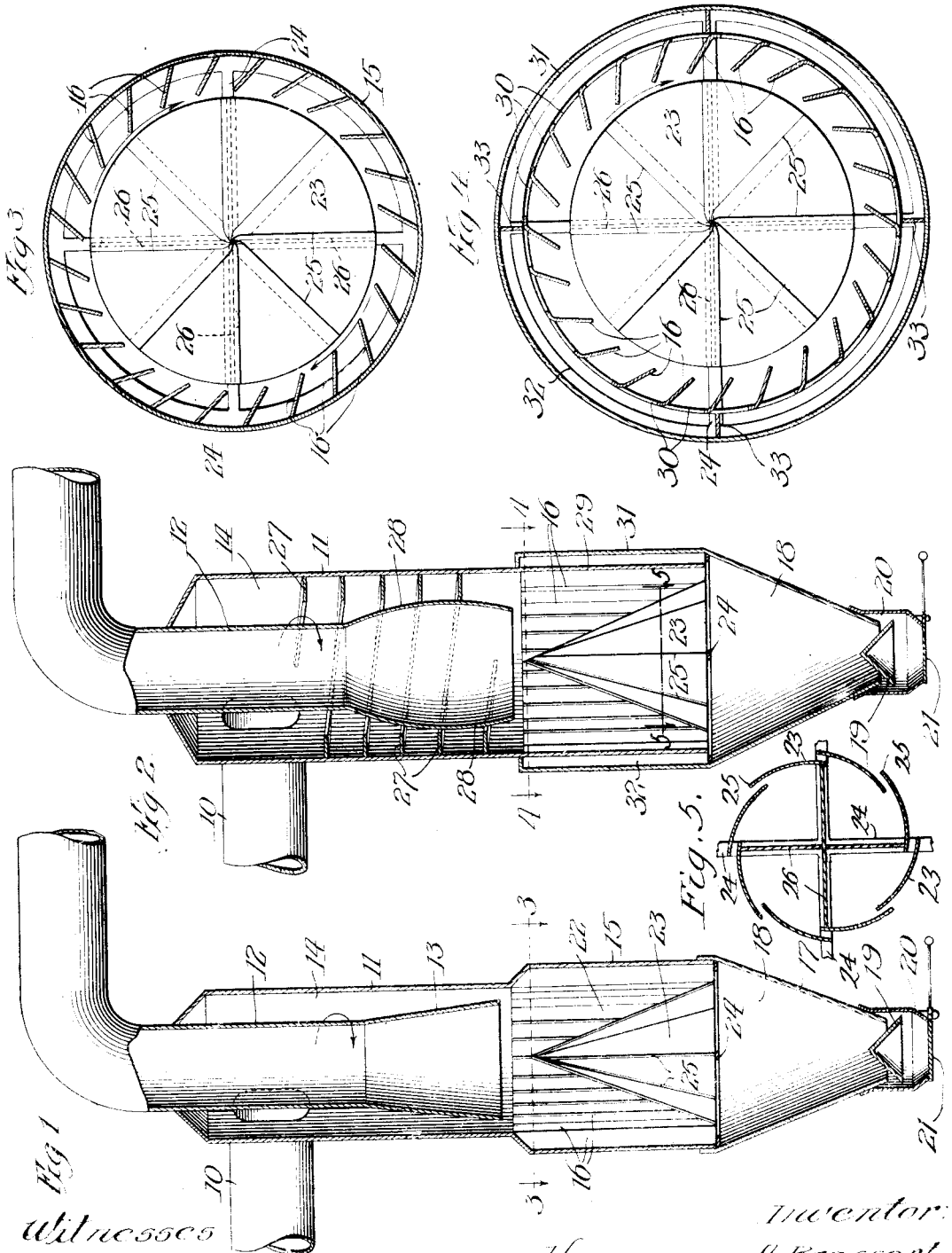

HERMANN A. BRASSERT, OF CHICAGO, ILLINOIS.

APPARATUS FOR CLEANING GAS.

1,066,704.　　　　Specification of Letters Patent.　　Patented July 8, 1913.

Application filed March 16, 1911. Serial No. 614,927.

*To all whom it may concern:*

Be it known that I, HERMANN A. BRASSERT, a citizen of the United States, residing at Chicago, in the county of Cook and State of Illinois, have invented certain new and useful Improvements in Apparatus for Cleaning Gas, of which the following is a specification.

My invention relates to a method for cleaning gas and the apparatus used in connection therewith, and is especially adapted for employment in cleaning gas from blast furnaces for smelting iron.

In Patent 969,769, granted September 13, 1910, to Brassert & Witting, a method and apparatus for carrying out the same were described and claimed, of which the present invention constitutes an improvement.

In the apparatus described in the above mentioned patent the gas was introduced tangentially into an annular chamber and brought into contact with ribs or baffles located on the inner wall of the periphery of the gas cleaner. After passing through the annular chamber formed between the outer casing of the gas cleaner and an outlet pipe having a flared end, to increase the velocity of the gas, the direction of flow of the latter was reversed and its velocity suddenly decreased as it passed outwardly through the outlet pipe.

I have found that the centrifugal action on a current of gas laden with dust is the most powerful agent in making a separation between the dust and the gas. In order to increase this action I have, in the preferred form of this invention, eliminated the baffles, or dust receptacles, from the periphery of the restricted area, and in this manner have reduced the friction in this part of the apparatus, thus allowing the maximum velocity to be obtained by the gas, and thereby securing the maximum centrifugal force on the particles of dust. The baffles, or dust receptacles are preferably placed entirely below the annular chamber surrounding the outlet pipe.

The baffles are attached to the inner surface of the outer casing of the gas cleaner, in a manner similar to that described in the above-mentioned patent to Brassert & Witting, but are located below the lower edge of the outlet pipe.

I have further established through experiments that there is an area of lower pressure or partial vacuum at the bottom of the apparatus due to the reversal of motion of the gas. This partial vacuum tends to pull that portion of the dust which is not held by the baffles placed on the periphery upwardly and inwardly into the current of the gas. In order to prevent this part of the dust from being carried along with the gas, I have in the present invention not only provided baffles or the like on the periphery of the main chamber of the dust cleaner, but also auxiliary baffles which are preferably mounted on a cone, the apex of which is substantially in a line with the central axis of the outlet pipe. In this way I not only remove dust from the gas by centrifugal force as the gas is swept around the periphery of the main chamber of the dust-catcher, but when the direction of flow is reversed and the gas moves radially toward the central axis of the dust-catcher I remove the dust which may not have been previously removed by the peripheral baffles. It is particularly advantageous to have the auxiliary baffles mounted on a cone, as the gas in reversing its direction naturally moves in an upwardly tapering vortex and follows the outline of a cone. In this way the gas from my dust-catcher is cleaned to an even greater extent than is the case in the apparatus described in the Brassert & Witting patent above mentioned.

In a modified form of apparatus I form the peripheral baffles by punching and bending inwardly suitable portions of the main casing of the dust cleaner, thereby forming apertures in the same. An auxiliary casing is provided outside of the portion of the main casing in which these baffles are thus formed, thereby providing an annular chamber which receives the dust. Rotary motion of the gas within this annular chamber is prevented by means of suitable partitions. I also find it of advantage in certain cases to provide a guiding spiral in the annular chamber formed between the outer casing of the dust cleaner and the outer surface of the outlet pipe, the function of this spiral being to prevent the gas from too rapidly assuming a vertical path.

These and other advantages of my invention will be more readily understood by reference to the accompanying drawings, which show preferred embodiments of the same, and in which—

Figure 1 is a vertical section through my improved dust-catcher, the dust-catching cone being shown in elevation; Fig. 2 is a vertical section through a modified form of dust-catcher; Fig. 3 is a transverse section on the line 3—3 of Fig. 1; and Fig. 4 is a transverse section on the line 4—4 of Fig. 2; Fig. 5 is a transverse section of the cone, taken on the line 5—5 of Fig. 2.

The inlet pipe 10 leads from the downcomer of a blast furnace, and is tangentially connected with the main casing or conduit 11 of the dust-catcher. Projecting downwardly within the casing 11 is the outlet pipe 12, preferably having the flared end 13, thus forming an annular chamber 14 between the inside of casing 11 and the outside of the outlet pipe 12 and its flared end 13. The lower portion 15 of the casing 11 is preferably somewhat larger in diameter than the upper portion thereof, and is provided with a series of inwardly projecting baffle plates 16, which are preferably disposed at an angle to the corresponding radii extending to the center of the cylindrical dust-catcher, as shown in Fig. 3. Connected with the lower portion 15 of the casing 11 is the cone-shaped casing 17, within which is formed the dust-receiving chamber 18. In the bottom of this chamber is the cone 19, which serves to direct the dust toward the periphery of the dust outlet pipe 20, which is suitably closed by the gate 21.

Within the chamber 22, contained within the lower portion 15 of the casing 11, is placed the cone 23, which may be suitably supported by the grid 24. This cone is provided with a series of baffles 25, which are disposed as indicated in Fig. 3. These baffles 25 may be mounted on the outer wall of the cone 23, or may be bent outwardly from openings which are punched in the surface of the cone. If the latter, which is the preferred construction, is used, I employ partitions 26 within the cone for the purpose of preventing whirling of the gas therein.

The construction which I have shown in Figs. 2 and 4 is much similar to that shown in Figs. 1 and 3. On the inner wall of the casing 11 I provide a spiral 27 for the purpose of directing the path of flow of the gas, as will be described hereafter. The lower end of the outlet pipe 12 is provided with the barrel-shaped portion 28. The outer casing 11 in its lower portion 29 is supplied with the baffles 16, which instead of being mounted on the casing are bent inwardly therefrom, thus forming the apertures 30. The portion 29 of the casing is inclosed by the outer casing 31, thus forming an annular chamber 32, in which are placed the partitions 33 to prevent the whirling of gas in this annular chamber.

Having thus described the construction of the apparatus, my method of operation may now be readily understood. The gas enters the dust-catcher tangentially through the inlet pipe 10, and is given a whirling motion in a downward direction through the annular chamber 14. I prefer to gradually increase the velocity of the gas by means of either the flared end 13 of the outlet pipe 12 or the barrel-shaped end 28. The gas may either pass freely through the annular chamber 14, as shown in Fig. 1, or may be guided by means of the spiral 27. When the form of apparatus shown in Fig. 1 is used, the rapidly revolving gas is carried by centrifugal force against the baffles 16, the gas moving in the direction indicated by the arrow in Fig. 3. The centrifugal force exerted by the gas whirling at a high velocity serves to throw the dust therein to the periphery of the apparatus, and this dust is, as it were, shaved off from the whirling body of gas by means of the baffles 16. This dust then falls by gravity into the dust-receiving chamber 18, from which it may be removed from time to time through the gate 21. When the gas reaches the chamber 22 its direction of flow is changed from being peripheral to radial so that it may escape through the outlet pipe 12. During this change of direction the gas is brought into contact with the baffles 25 of the cone 23, and in this way further dust is removed from the gas. The gas finally passes outwardly through pipe 12 at a much decreased velocity on account of the comparatively large cross-sectional area of said pipe. When the barrel-shaped end 28 of the pipe 12 is employed, as shown in Fig. 2, on account of the inwardly curved lower end of said portion 28 the gas is given a tendency to move in a radial direction against the cone 23 even before the gas reaches the lower edge of the outlet pipe. In this way the baffles 25 of the cone 23 do a larger proportion of the work of removing the dust than is the case in the form of apparatus shown in Fig. 1. When the annular chamber 32 and the openings 30 are used, it will be apparent that the dust will be thrown by centrifugal force into said chamber, while the gas, on account of the fact that its whirling motion is stopped by the partitions 33, is prevented from movement within said annular chamber and the dust-receiving chamber 18, and the direction of flow of the main body of gas is gradually changed to a radial one, and it escapes through the outlet pipe 12.

It will be apparent to those skilled in the art that many changes could be made in the method of operation and the apparatus which I have described without departing from the spirit or scope of my invention.

What I claim is:

1. In an apparatus for cleaning gas, the combination of a conduit, means for introducing gas tangentially into said conduit, an outlet pipe projecting into said conduit and a cone having its sides converging upwardly and provided with dust catching means thereon, the axis of said cone being in line with the axis of said outlet pipe.

2. An apparatus for cleaning gas, comprising an upright conduit having a tangential inlet in the upper portion thereof, a dust collecting chamber below the inlet, an outlet pipe extending downwardly through the top of the conduit and terminating short of the dust collecting chamber, an expansion chamber between the bottom of the outlet pipe and the dust collecting chamber, a grid below the outlet pipe, and a cone supported upon the grid with its axis in line with the axis of the outlet pipe, said cone having its walls converging upwardly and provided with dust catching means thereon, substantially as described.

3. In an apparatus for cleaning gas, the combination of a conduit, means for introducing gas tangentially into said conduit, an outlet pipe projecting into said conduit, a cone located below said outlet pipe with its axis in line with the axis of the outlet pipe, said cone having a series of baffles extending outwardly from its surface and a series of apertures communicating with its interior, and means within said cone for preventing whirling of the gas, substantially as described.

HERMANN A. BRASSERT.

Witnesses:
Wm. S. Bowen,
A. H. Young.